United States Patent [19]
Parks et al.

[11] 4,325,122
[45] Apr. 13, 1982

[54] METHOD AND APPARATUS FOR EVENT RATE PROSPECTING AND APPLICATION TO WIND PROSPECTING

[76] Inventors: Bennett A. Parks, 3230 St. Matthews Dr., Sacramento, Calif. 95821; Stephen I. Parks, 19616 Meredith Dr., Derwood, Md. 20855

[21] Appl. No.: 110,951

[22] Filed: Jan. 10, 1980

[51] Int. Cl.³ .............................................. G06F 15/54
[52] U.S. Cl. .................................. 364/420; 73/170 R
[58] Field of Search ............. 364/420; 73/170 R, 189

[56] References Cited

U.S. PATENT DOCUMENTS

| | | | |
|---|---|---|---|
| 3,934,129 | 1/1976 | Taylor et al. | 364/571 X |
| 4,043,194 | 8/1977 | Tanner | 364/420 X |
| 4,155,252 | 5/1979 | Morrill | 364/492 X |

Primary Examiner—Edward J. Wise
Attorney, Agent, or Firm—Townsend and Townsend

[57] ABSTRACT

Method and apparatus for field evaluation of interrelated variables derived from event count per unit time. The method comprises simultaneously integrating selected multiple powers of the event count per unit time and registering only the resultant values. The apparatus is a self-contained portable electronic instrument which is employed in connection with an event count input device such as a digital anemometer which includes a plurality of digital rate multipliers and associated integrators coupled in a chain. It further includes power saving circuitry to turn off the apparatus when data retrieval conditions are not of interest. The method and apparatus are particularly useful for wind prospecting at remote sites where wind energy and optimum wind design speed are sought to be determined. The method and apparatus may also be employed for monitoring water flow, air and water pollution, traffic flow and any other phenomenon where an event count per unit time can be related to the phenomenon.

12 Claims, 1 Drawing Figure

METHOD AND APPARATUS FOR EVENT RATE PROSPECTING AND APPLICATION TO WIND PROSPECTING

BACKGROUND OF THE INVENTION

1. Field of the Invention

This invention relates to field data gathering techniques for any phenomenon where an event count per unit time can be related to the phenomenon. In particular, the invention relates to a wind prospecting instrument for remote field sites wherein raw data are preprocessed by wind run techniques. The wind run techniques are employed to develop a plurality of interrelated variables indicative of wind conditions at the site of the instrument. The invention herein will be described as it relates to wind prospecting, but other applications will be apparent by analogy.

It is desirable to provide a technique for acquisition and registration of specific information about wind movement at a wide variety of specific sites under various conditions employing the minimum amount of instrumentation. Specifically, it is desirable to retrieve sufficient information about each site or area of interest to allow satisfactory calculation of at least the wind energy density, herein notated as $E_0$, the mean energy wind speed, $v_e$, the mean wind energy variability, $\sigma_e$, the mean wind speed, $v$, and the mean wind variability $\sigma_t$. Meteorological conditions and terrain, particularly in mountainous areas, are so diverse that interpolation and extrapolation of conditions at regional sites, such as weather stations of the National Weather Service, are often not meaningful.

Recently Dr. Edwin X Berry of Atmospheric Research and Technology, Inc., of Sacramento, California, developed and reported on certain advanced theoretical techniques for analysis of wind energy. (See Berry, WIND RESOURCE ASSESSMENT IN CALIFORNIA, California Energy Commission Report, May 1979.) According to Dr. Berry's report, there are two key density functions useful to wind analysis, namely, the time density function, $t<v>$, which is the amount of time between any two wind speeds in time per wind speed, and the energy density function, $e<v>$, which is defined as $$e<v> = \tfrac{1}{2}\rho v^3 t<v> \text{ (in units of energy density per wind speed),}$$

where $\rho$ is air density.

These two density functions, the time density function and the energy density function, are characterized by key time-related intervals as follows:

| | |
|---|---|
| $T_0 = \int dt$ | (Time to gather sample) |
| $T_1 = \int v\, dt$ | (Wind run) |
| $T_2 = \int v^2 dt$ | |
| $E_0 = \tfrac{1}{2}\rho \int v^3 dt$ | (Total energy in the sample) |
| $E_1 = \tfrac{1}{2}\rho \int v^4 dt$ | |
| $E_2 = \tfrac{1}{2}\rho \int v^5 dt$ | |

It should be noted that in the above integrals are taken over time rather than velocity and that $$dt = t<v>\, dv.$$

Retrieval of data in the form of these time-related integrals can be used directly and indirectly in wind-energy assaying without the need for high resolution (and thus expensive and wasteful) raw data retrieval, such as continuous chart recorders, magnetic tape and/or telemetry systems. Moreover, these time-related integrals contain much information which would be omitted in long period time-sampled data retrieval techniques, such as a reliable measure of wind variability.

It is therefore the purpose of this invention to provide a simple, inexpensive and reliable method and apparatus for retrieving data in a preprocessed form which is sufficient to extract all information found in the time density function and the energy density function, including their respective integrals and moments, which can be used in wind assaying for such applications as identifying suitable sites and optimal design for electricity generating wind turbines.

2. Description of the Prior Art

A few instruments are available which compute some of the integrals useful for wind assaying. For example, an instrument is distributed by Natural Power Company of Waterford, Connecticut which employs non-linear analog amplifiers to compute energy. Because this instrument is analog in nature, it has the disadvantage of inaccuracies due to temperature sensitivity of the components.

Helion, Inc. of Brownsville, California now manufactures a microprocessor-based data logger system which was developed after the present invention. The Helion instrument has the capability of generating the integrals related to the energy density and the time density functions using a simple multiplier and summer. This instrument is considered complementary rather than a suggestion of the present invention, since it may be used for detailed analysis and further surveying of specific sites. The instrument has the disadvantage that it is not designed to sample and compute the integrals of interest on a substantially continual basis. Rather, it is understood that the instrument operates intermittently, collecting raw data and then processing the data in accordance with instructions in its preprogrammed microprocessor. As a further disadvantage, it does not have a field readout feature. Its usefulness is generally limited to applications where power is readily available or the instrument is frequently monitored, or to applications where intermittent sampling of conditions will suffice. It is understood that the Helion instrument does not preprocess retrieved data to the extent herein taught.

SUMMARY OF THE INVENTION

According to the invention, a method and apparatus provide field evaluation of interrelated variables derived from event count per unit time, such as the output signal of an anemometer. The method comprises simultaneously integrating multiple powers of the event count per unit time and registering only the resultant values. The apparatus is a self-contained portable electronic instrument which is employed in connection with the event count input device and includes a plurality of digital presettable counters coupled in a chain and employing rate multiplication techniques to produce values which are then time integrated by further counters. The instrument further includes power saving circuitry to turn off the apparatus when data retrieval conditions are not of interest, such as extremely low or high count rates. The method and apparatus are particularly useful for wind prospecting at remote sites where wind energy, optimum wind design speed for a turbine and other variables of interest are sought to be determined.

The method and apparatus may also be employed for monitoring any phenomenon where event count per unit time can be related to the phenomenon, such as monitoring water flow, air and water pollution, traffic and the like.

One of the purposes of this invention is to provide a method and apparatus for low-cost reliable wind prospecting. Another purpose of this invention is to provide a portable instrument which consumes a minimum amount of energy, is rugged and is substantially self-contained, and which would be suitable for deployment at a remote site for substantial periods of time. Other purposes and advantages of this invention will be apparent upon reference to the following detailed description taken in conjunction with the accompanying figure.

DETAILED DESCRIPTION OF SPECIFIC EMBODIMENTS

Figure 1:
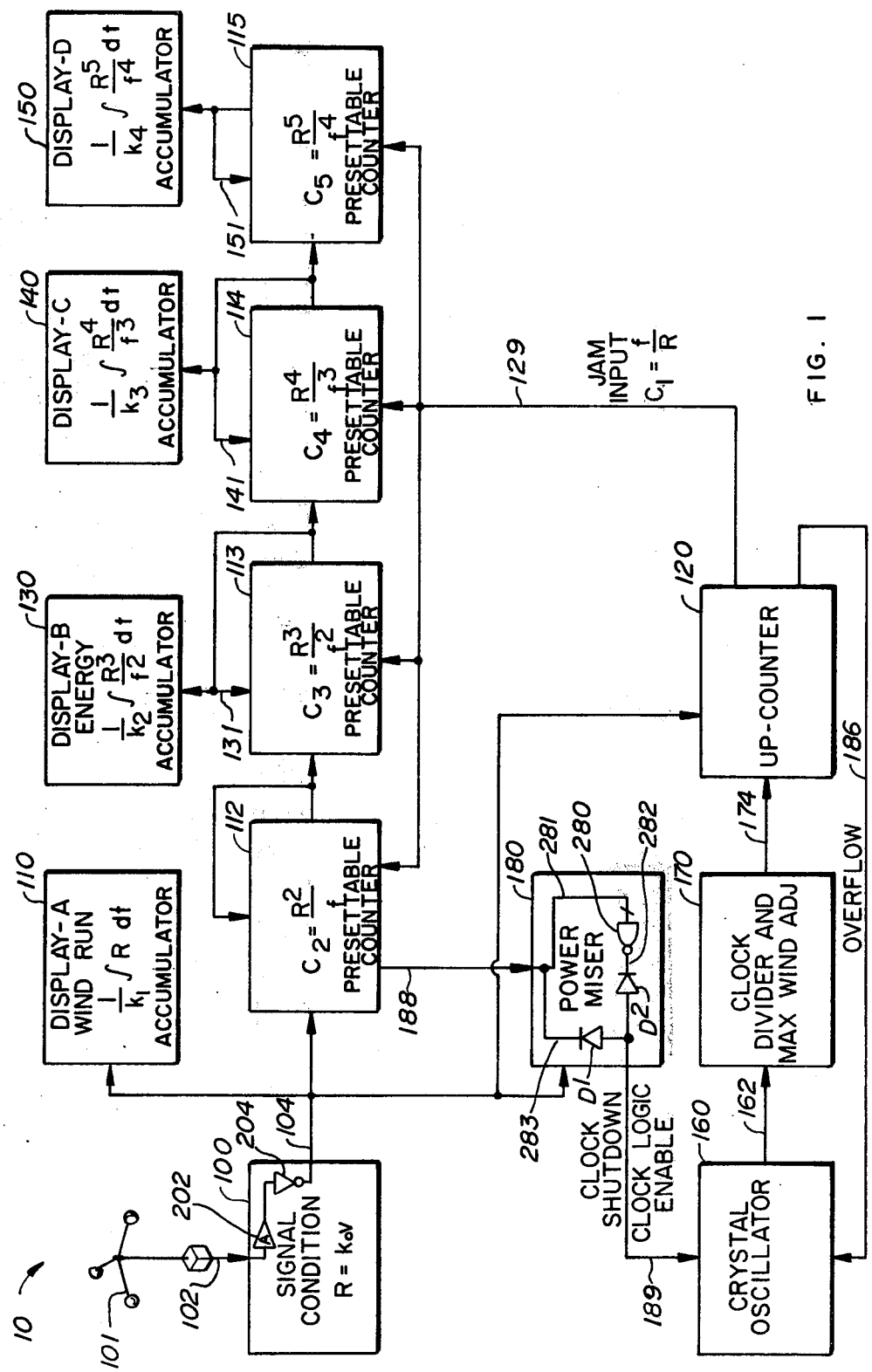
FIG. 1 is a block diagram of an apparatus operative according to the method of the invention.

FIG. 1 illustrates an apparatus which develops a set of time integrals of wind speed, wind speed squared, wind speed cubed, wind speed to the fourth power, and wind speed to the fifth power, which will provide the investigator with sufficient information to characterize wind and its variability at the site of the instrument. It will be noted that the time integral of the wind speed cubed gives the true energy in the wind. The other integrals give information on the variability of the wind, and the linear displacement of the wind at the site of data acquisition.

Referring to FIG. 1, an apparatus 10 receives a signal from a digital anemometer 101 through an input line 102 where it is conditioned at a signal conditioner 100 to produce a clean pulse stream output R which is equal to a constant times the wind velocity, v, on signal line 104.

The signal conditioner 100 comprises an amplifier 202 having as an input signal the anemometer signal on input line 102. The output of the amplifier 202 is coupled to the input terminal of an inverter 204. The output of the inverter 204 is the signal line 104.

The signal line 104 is coupled to the input of accumulator display A 110, up-counter 120, first rate multiplier 112 and power miser circuit 180. The output 128 of the first rate multiplier 112 is coupled to the clock input of a second rate multiplier 113, the output 131 of which is coupled to accumulator display B 130 and to the clock input of a third rate multiplier 114. The output 141 of the third rate multiplier 114 is coupled to the clock input of a fourth rate multiplier 115 and to the input of accumulator display C 140. The output 151 of fourth rate multiplier 115 is coupled to accumulator display D 150. The respective outputs of each of the rate multipliers are also coupled back into the latch input for presetting the rate multipliers 112, 113, 114 and 115 are typically type CD4029 presettable counters.

The first rate multiplier 112 is also coupled to the power miser circuit 180. The output of power miser circuit 180 is a shutdown/enable line 189 which is operative to enable a crystal oscillator 160. The power miser circuit 180 comprises diodes D1 and D2 and a multiple input NAND gate 280. The inputs of the NAND gate 280 is the output bus of the first rate multiplier 112, the output of the NAND gate 280 being coupled to the cathode of diode D2 by a high-speed disable line 282. The NAND gate 280 senses an all one's condition indicating overflow and excessive wind speed. The anode of diode D2 is coupled together with the anode of diode D1 to line 189. The cathode of diode D1 is coupled to the carry output of the first rate multiplier 112 to sense low wind speed conditions. The output 162 of crystal oscillator 160 is coupled to a clock divider 170 which includes a maximum speed adjustment as hereinafter explained. The output 174 of the clock divider 170 is a constant pulse stream of rate F, which is applied to the input of up-counter 120. The carry output of the up-counter 120 is coupled via line 186 to the crystal oscillator 160. The output 129 of counter 120 is coupled to the jam inputs of the rate multipliers 112, 113, 114 and 115.

The accumulator displays 110, 130, 140 and 150 each comprise a digital counter/driver and digital display device. The device accumulates the number of input pulses and displays a scaled result. Since discrete summation is substantially equivalent to continuous integration in time, the accumulator displays 110, 130, 140 and 150 serve simply as integrators which register and display the resultant integral. A standard device having the capabilities as outlined above is a type MM74C925 counter with output drivers coupled to a type NSA1541 LED display, both of which are available from National Semiconductor of Santa Clara, California.

The input device, the anemometer 101, is a standard wind measuring device which generates a digital pulse train or its equivalent in linear relation to the wind speed. Suitable devices are the Sencenbaugh, Maximum, or Climatronics anemometers. The signal conditioner 100 is a pulse shaping circuit, which includes a level comparator which produces a regular pulse stream.

The counter 120 is a device which accumulates the pulse count of the clock 170 between selected anemometer pulses. The resultant count is the value $C_1 = f/R$, where f is the steady clock stream count and R is the anemometer pulse stream count, which is related to the measured wind velocity v by the relation $R = k_0 v$. Thus, the greater the wind speed, the lower the value of $C_1$. If the value $C_1$ exceeds a preset level, indicating low wind speed, signal line 186 is activated to clamp off the crystal oscillator 160.

The rate multipliers 112–115 are presettable down counters connected in a chain. The jam inputs of the rate multipliers 112–115 are coupled to the output line 129 of counter 120 whereby they receive the value $C_1$. The rate multipliers 112–115 are each a device which subtracts the pulse count at its clock input from the value applied at its jam input terminals. At the minimum count, the carry output signal changes state and is applied to the count input of the next rate multiplier in the chain. The effect is to generate a value which is the product of the count input and the inverted jam input value. The count input value to the next multiplier is itself a product. Hence, the calculation at rate multiplier 112 is $R \cdot R/f$; at rate multiplier 113 it is $R/f \cdot R^2/f$; at rate multiplier 114 it is $R/f \cdot R^3/f^2$; and at rate multiplier 115 it is $R/f \cdot R^4/f^3$. Each of these computed values, except the output of rate multiplier 112, is fed to the respective accumulator displays 130, 140 and 150, where the values are accumulated, that is, integrated over time, in accordance with the integral equations reported by Berry.

The power miser circuit 180 is provided to turn on the relatively high energy dissipating crystal oscillator 160 only when the input signal rate is within a value of interest, and particularly to turn on the crystal oscillator 160 sufficiently early to assure a stable count when the input signal rate is within the range of interest. The power miser circuit 180 comprises essentially a multiple input NOR gate which monitors the count outputs of the first rate multiplier 112. The rate multiplier 112 is operative as a down-counter which is clocked by the input 104 from the preset count of jam input 129. The crystal oscillator 160 needs to operate only during the interval of the one to zero transition of the rate multiplier 112, and during a preparatory period sufficient to assure oscillator stability. The oscillator 160 is disabled, and hence does not drain power, at all other times. Functionally the power miser circuit 180 monitors the output of the down-counter through signal line 188, enables the oscillator 160 beginning at the second interval prior to the zero count and then shuts off the oscillator 160 after the calculation of $C_1$ by up counter 120. Thus, the crystal oscillator 160, which drains about fifty times as much power as the rest of the device, is only operated when necessary to assure proper calibration.

The clock divider 170 is operative to subdivide the output signal of the crystal oscillator on line 162 to a rate value f which is employed to scale the computed product. The divider 170 also includes a maximum speed adjustment, which is a gating tap to a selected decoded output of a counter/divider having multiple decoded outputs. A device which is suitable for such an application is a type CD4017 device available from National Semiconductor. The gating tap of clock divider 170 is essentially operative to disable the up-counter 120 whenever the anemometer 101 count rate exceeds the maximum value of interest. The effect is to prevent measurements of wind energy above those wind speeds where a wind driven turbine would normally be feathered to prevent damage due to gale force winds.

Although the operation of the invention may be evident from the explanation of the individual components, the following explanation of operation should be further helpful. The method according to the invention is for the evaluation of interrelated variables for a predetermined period in response to an event count per unit time, as for example wind movement measured by a digital anemometer. The method comprises the steps of simultaneously computing the event count squared per unit time, the event count cubed per unit time squared, and the event count to the fourth power per unit time cubed; and registering at least the integrated event count cubed per unit time squared and a representation based on the integrated event count to the fourth power per unit time cubed. This method may be accomplished by a plurality of chained rate multipliers, the selected outputs of which are coupled to integrators, and at least one of which is directly displayed. The registration of a representation based on the integrated event count to the fourth power per unit time cubed may be in the form of the display of the results of some further computation, as for example a computation of the ratio of the noted value to another constant or computed variable.

In addition, the method may include the step of accumulating the event count, that is integrating the event count for a predetermined period of time, and registering the event count thus integrated. In applications to wind prospecting, these steps correspond to measuring the wind run.

In addition, still further computations can be performed, for example, integrals of higher powers. The inventive method may therefore include the further steps of integrating the event count to the fifth power per unit time to the fourth power and registering the representation thereof, as for example, a representation based on some other computation. Alternatively, there may be direct registration of the integrated event count to the fourth power per unit time cubed as well as registration of the integrated event count to the fifth power per unit time to the fourth power. These values are useful in those forms for preserving information which may be lost in the event the data are employed to process for further variables.

A specific method according to the invention is applied to the assaying of behavior of interrelated variables at remote locations in response to the output of an event counting sensor having an output signal as a digital pulse stream whose rate is proportional to an increment of events per unit time to be measured. The method comprises the steps of accumulating a value representative of accumulating events for a predetermined period by applying the pulse stream signal to a first counter for the predetermined period, digitally integrating the square of the pulse stream signal by a first constant signal for the predetermined period, accumulating a value representative of real energy for a predetermined period by digitally integrating the cube of the pulse stream signal divided by the square of the first constant signal only as the constant signal is applied, accumulating a value representative of a first energy density function for the predetermined period by integrating the fourth power of the pulse stream signal divided by the cube of the first constant signal simultaneously with the integrating of the cube of the pulse stream signal and only as the constant signal is applied, and registering the accumulating events value, the real energy value and the first energy density function value. Each of these values have specific meaning to phenomenon assaying, as reported by Berry.

The method is further enhanced by including steps of accumulating the value representative of the second energy density function for the predetermined period by integrating the fifth power of the pulse signal divided by the fourth power of first constant signal simultaneously with the integrating of the cube of the pulse stream signal only as the constant signal is applied to the device. The second energy density function value is then registered for further direct assaying of the character of the interrelated variables.

An important aspect of the invention is the inclusion of energy conserving steps. For example, the constant signal may be the pulse stream output signal of an oscillator, such as crystal oscillator 160, and the steps may include the applying of the constant signal only when the rate of the accumulating events at the input of the device is greater than a minimum preselected value. In this manner, energy expended by the oscillator and its related circuitry is conserved for those periods when the oscillator is actually in use.

The method can be further enhanced by applying the constant signal to the device only when the rate of the accumulating events is less than a maximum preselected value, thereby eliminating from the generated values unmeaningfully rapid rates of events.

A specific method according to the invention includes steps such that the input digital pulse stream signal applied at the input of a first rate multiplier initiates a signal at a preselected transition causing an accumulated oscillator count representative of event rate to be jammed into the rate multipliers and wherein the rate multipliers are operative as down-counters. Specifically, the above step takes place only if the event rate is greater than a minimum preselected value. The event rate is not greater than a preselected value, an overflow condition of accumulated oscillator count results which causes the oscillator to shutdown and thereby to inhibit power drain.

A further step in the method of the invention is to turn off the oscillator whenever the input pulse stream is absent or disconnected.

The invention has now been explained with reference to specific embodiments. It should be noted that other embodiments and applications will be apparent to those of ordinary skill in the art in light of this disclosure. For example, those rate multipliers whose outputs are integrated and displayed may be incorporated into a single functional unit which compute the variables and the integrals. Other phenomenon could be measured where the rate multiplier input 129 could be derived from encoded angular position data rather than encoded time information. It is therefore not intended that the invention be limited except as indicated by the appended claims based on a reasonable interpretation of this specification.

What is claimed is:

1. A method for assaying behavior of interrelated variables for a predetermined period as a plurality of numerical values at remote locations in response to the output of an event counting sensor having an output signal as a digital pulse stream whose rate is proportional to an increment of events per unit time to be measured per unit time said method comprising the steps of:
    accumulating a value representative of accumulating events for said predetermined period by applying said pulse stream signal to a first counter for said predetermined period;
    digitally integrating the square of said pulse stream signal by a first constant signal for said predetermined period;
    accumulating a value representative of real energy for said predetermined period by digitally integrating the cube of said pulse stream signal divided by the square of said first constant signal only as said constant signal is applied;
    accumulating a value representative of a first energy density function for said predetermined period by integrating the fourth power of said pulse stream signal divided by the cube of said first constant signal simultaneously with the integrating of said cube of said pulse stream signal only as said constant signal is applied; and
    registering said accumulating events value, said real energy value and said first energy density function value.

2. The method as claimed in claim 1 further including the steps of accumulating a value representative of a second energy density function for said predetermined period by integrating the fifth power of said pulse stream signal divided by the fourth power of said first constant signal simultaneously with the integrating of said cube of said pulse stream signal only as said constant signal is applied; and
    registering said second energy density function value for further direct assaying of the character of said interrelated variables.

3. The method as claimed in claim 1 or 2 wherein said first constant signal is a pulse stream output signal of an oscillator and further including the step of applying said constant signal only when the rate of said accumulating events is greater than a minimum preselected value for conserving energy expended by said oscillator.

4. The method as claimed in claim 3 further including the step of applying said constant signal only when the rate of said accumulating events is less than a maximum preselected value greater than said minimum preselected value for regulating unmeaningfully rapid rates of events.

5. The method as claimed in claim 3 wherein said constant signal is applied to a presettable up-counter having a jam output and the jam output of said up-counter is applied in synchronism with said oscillator in parallel to at least first, second and third presettable down-counters, corresponding respectively to a pulse stream squared rate multiplier, a pulse stream cubed rate multiplier and a pulse stream to the fourth power rate multiplier, and wherein an overflow output of said up-counter is applied to a disable input of said oscillator, further including steps such that said digital pulse stream signal applied at the input of said first down-counter initiates a count enable signal at a preselected transition to said up-counter and thereafter to jam an accumulated oscillator count representative of event rate into said down-counters if said event rate is greater than said minimum preselected value or to cause an overflow condition of accumulated oscillator count to disable said oscillator and thereby to inhibit power drain.

6. The method as claimed in claim 5 further including steps such that said pulse stream is further applied to an apparatus for sensing the absence of said pulse stream which causes said oscillator to turn off and thereby inhibit power drain.

7. The method as claimed in claim 1 applied to wind prospecting wherein said event counting sensor is an anemometer whose digital output signal is a pulse stream whose length is representative of wind run and whose rate is representative of substantially instantaneous wind speed, and wherein said accumulating events value is a measure of wind run said real energy value is a measure of wind energy content during the applying of said rate signal and said first energy density value is a value which when divided said wind energy content measure is a measure of mean wind speed during the applying of said rate signal.

8. A method for evaluation of digital signals representative of sensed physical phenomena for a predetermined period, said phenomena being registered as a digital bit stream signal which is a ratio of event counts of variable frequency to reference counts of known fixed frequency, said method comprising the steps of:
    simultaneously digitally computing the square of the event counts per unit reference count, the cube of the event counts per unit reference count squared, and the fourth power of the event counts per unit reference count cubed in presettable counter means to generate first, second and third count ratios;
    digitally accumulating said second and third count ratios for a period of time in selected accumulating digital counting means to generate second and third integrated count ratios; and
    registering said second and third integrated count ratios in a digital value output means in order to characterize said sensed physical phenomena.

9. The method as claimed in claim 8 further including the steps of:

digitally accumulating said first count ratio for a predetermined period in an accumulating counter to generate a first integrated count ratio; and registering a representation thereof in a value output means for measuring the total duration of said physical phenomena.

10. The method as claimed in claim 9 further including the steps of simultaneously computing digitally the fifth power of the event counts per unit reference count to the fourth power to generate fourth count ratios;

digitally accumulating said fourth count ratios for a period of time in selected accumulating digital counting means to generate fourth integrated count ratios; and registering said fourth count ratio in a digital value output means for further characterizing said sensed physical events.

11. An apparatus for measuring wind at remote locations in connection with an anemometer, said anemometer having as an output a digital bit stream signal whose bit count rate is proportional to wind speed, said apparatus comprising:

clock means for generating a digital reference signal representing a fixed reference frequency;

a first counter responsive to said digital reference signal and said digital bit stream signal for generating first values signals representing the ratio of said digital reference signal and said digital bit stream signal;

a second counter responsive to said digital bit stream signals for accumulating a first sum of digital counts over a period of time, said first sum representing wind run;

a first display means responsive to said second counter for displaying said first sum;

a first presettable counter means having as a count input signal said digital bit stream signal and as a presettable input signal said first values signals, said first presettable counter means for generating second values signals representative of the product of said digital bit stream signal and said first values signals;

a second presettable counter means having as a count input signal said second values signals, said second values signals being the carry output of said first presettable counter means, and as a presettable input signal said first values signals, said first presettable counter means for generating third values signals representative of the product of said second values signals and said first values signals;

a third presettable counter means having as a count input signal said third values signals, said third values signals being the carry output of said second presettable counter means, and as a presettable input signal said first values signals, said third presettable counter means for generating fourth values signals representative of the product of said third values signals and said first values signals;

a fourth presettable counter means having as a count input signal said fourth values signals, said fourth values signals being the carry output of said third presettable counter means, and as a presettable input signal said first values signals, said fourth presettable counter means for generating fifth values signals representative of the product of said fourth values signals and said first values signals;

a third counter responsive to said third values signals for accumulating a second sum of digital counts over said period of time, said second sum representing wind energy;

a third counter responsive to said fourth values signals for accumulating a third sum of digital counts over said period of time;

a fifth counter responsive to said fifth values signals for accumulating a fourth sum of digital counts of said period of time;

means for displaying said first sum, said second sum, said third sum, and said fourth sum for characterizing said measured wind.

12. The apparatus according to claim 11 further including means for sensing absence of said digital bit stream signal for causing said clock means to turn off and thereby inhibit power drain.

* * * * *